(12) United States Patent
Sogame et al.

(10) Patent No.: US 7,097,233 B2
(45) Date of Patent: Aug. 29, 2006

(54) WIND DEFLECTOR OF OPEN CAR

(75) Inventors: Katsumasa Sogame, Hiroshima (JP); Isao Tohda, Hiroshima (JP); Hiroki Ohira, Hiroshima (JP); Takaki Nakamura, Hiroshima (JP); Yoko Kyubun, Hiroshima (JP); Haruo Ohe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/151,656

(22) Filed: Jun. 14, 2005

(65) Prior Publication Data
US 2005/0280285 A1    Dec. 22, 2005

Related U.S. Application Data

(63) Continuation-in-part of application No. 11/000,071, filed on Dec. 1, 2004, now abandoned.

(30) Foreign Application Priority Data

| Dec. 24, 2003 | (JP) | ............................. 2003-426406 |
| Dec. 24, 2003 | (JP) | ............................. 2003-426424 |
| Jan. 21, 2004 | (JP) | ............................. 2004-012528 |
| Aug. 23, 2004 | (JP) | ............................. 2004-241818 |

(51) Int. Cl.
B60J 1/20    (2006.01)
(52) U.S. Cl. ...................................... 296/180.1; 296/85
(58) Field of Classification Search ............. 296/180.1, 296/85
See application file for complete search history.

(56) References Cited

U.S. PATENT DOCUMENTS

| 4,618,385 A | 10/1986 | Mercer |
| 5,219,201 A | 6/1993 | Götz et al. |
| 5,368,356 A | 11/1994 | Götz et al. |
| 5,702,150 A | 12/1997 | Reuter et al. |
| 5,707,099 A | 1/1998 | Schrader et al. |
| 5,839,774 A * | 11/1998 | Hack et al. .................... 296/91 |
| 5,899,521 A | 5/1999 | Pfertner et al. |
| 6,213,865 B1 | 4/2001 | Odebrecht |
| 6,261,173 B1 | 7/2001 | Odebrecht |

(Continued)

FOREIGN PATENT DOCUMENTS

DE    86 08 906 U1    8/1986

(Continued)

OTHER PUBLICATIONS

European Search Report dated Apr. 1, 2005.

*Primary Examiner*—Joseph D. Pape
(74) *Attorney, Agent, or Firm*—Nixon Peabody LLP; Donald R. Studebaker

(57) ABSTRACT

A roll bar is provided behind seats of an open car, and there is provided a wind deflector to deflect air flow coming from the vehicle rear during the open-state driving on the roll bar. The wind deflector is configured so as to have air permeability in such a manner that an air permeability rate of its upper section is greater than that of its lower section. Part of air flow passes through the wind deflector. Since the amount of the air flow passing through the lower section of the deflector directed to the neck portion is suppressed compared to the air flow passing through the upper section, both the reducing of the air flow beyond the wind deflector and the suppressing of the passenger feeling displeasure with the air flow (against the neck portion) can be attained, and thereby the passenger can be prevented effectively from feeling displeasure.

8 Claims, 15 Drawing Sheets

U.S. PATENT DOCUMENTS 6,286,882 B1   9/2001   Rastetter

FOREIGN PATENT DOCUMENTS

| DE | 43 35 103 C1 | 11/1994 |
| DE | 100 21 136 A1 | 10/2001 |
| DE | 101 62 758 A1 | 7/2003 |

* cited by examiner

WIND DEFLECTOR OF OPEN CAR

This is a continuation-in-part of pending application Ser. No. 11/000,071, entitled "Wind Deflector Of Open Car" by K. Sogame et al, filed Dec. 1, 2004.

BACKGROUND OF THE INVENTION

The present invention relates to a wind deflector of an open car.

In a so-called open car, in which an upper portion thereof above a belt line except a windshield is foldable so as to be stored rearward, it is known that at a rear end portion of a cabin behind a driver seat is provided a wind deflector to prevent air having passed above the car from coming into the cabin, specifically into the vicinity of a passenger's head, from a vehicle rear (see U.S. Pat. No. 5,702,150).

In such an open car, particularly a so-called two-seater open car equipped with only driver and assistant seats, there is also generally provided a roll bar having a specified height in case of a rollover of the vehicle during an open-state driving. Since such a roll bar is provided behind the seats, like the above-described wind deflector, it may be preferable for the wind deflector to be provided integrally at the roll bar, from viewpoints of attachment or designing of the vehicle. The wind deflector disclosed in the above-described patent is fixed to the roll bar accordingly.

However, it may be difficult to shut off fully the air flow coming in from the vehicle rear by the above-described wind deflector. Particularly, since the height of the wind deflector is limited to a certain degree in order to ensure a necessary rear view for the driver via a rear view mirror, it may be inevitable that part of the air flow comes into the cabin beyond the wind deflector. Namely, in the event that the vehicle running speed increases exceeding a specified speed, the above-described part of the air flow beyond the wind deflector also increases, result in the air flow coming into the portion around the passenger's head. Accordingly, there still exists problems that the passenger would feel displeasure or an effective temperature which the passenger feels would decrease.

SUMMARY OF THE INVENTION

The present invention has been devised in view of the above-described problems, and an object of the present invention is to provide a wind deflector of an open car which can prevent properly the air flow coming in from hitting the passenger during the open-state driving, thereby not letting the passenger feel displeasure.

This object is solved by a wind deflector of an open car according to the present invention of claim 1. Preferred embodiments of the present invention are subject of the dependent claims.

According to the present invention, there is provided a wind deflector of an open car, in which an upper portion thereof above a belt line except a windshield is detachable or foldable so as to be stored, which is provided fixedly or detachably at a roll bar disposed behind a driver seat and an assistant seat and operative to substantially prevent an air flow from coming into a cabin from a vehicle rear behind the driver seat and the assistant seat and above the belt line, the wind deflector comprising a passing device operative to allow part of air flow coming from the vehicle rear to pass through the deflector forward, and an air-flow adjusting device operative to adjust the air flow passing through the deflector and being directed toward a head portion of a passenger.

Accordingly, since the passing device allows the air flow coming from the vehicle rear to pass through the deflector actively, the air flow coming in forward beyond the wind deflector can be reduced properly. Thus, the air flow coming from the vehicle rear during the open-state driving can be properly prevented from coming into the cabin, specifically in the vicinity of the passenger's head before the wind deflector, and the passenger can be prevented properly from feeling displeasure. Also, since the air flow passing through the deflector and being directed toward the head portion of the passenger is adjusted properly by the air-flow adjusting device, the passenger can be prevented further effectively from feeling displeasure with the air flow.

According to a preferred embodiment, the above-described wind deflector is configured so as to have air permeability in such a manner that an air permeability rate of an upper section thereof is greater than that of a lower section thereof.

It may be generally effective to provide the deflector with an uniformly grater air permeability rate in order to reduce the air flow coming in forward beyond the wind deflector. In this case, however, there is a concern that some air flow is directed to the passenger's neck portion which is relatively sensitive and this would cause another factor to make the passenger feel displeasure with the air flow (against the neck portion). According to the above-described embodiment, however, the lower section of the deflector has the relatively low air permeability, so that the amount of the air flow being directed toward the relatively sensitive neck portion of the passenger is suppressed (reduced). Meanwhile, the upper section of the deflector has the relatively great air permeability, so that the amount of the air flow being directed toward the head portion which is not so relatively sensitive is maintained at the enough one so as to reduce properly the air flow coming in forward beyond the wind deflector. Thereby, both the reducing of the air flow coming in forward beyond the wind deflector and the suppressing of the passenger feeling displeasure with the air flow (against the neck portion) can be attained, and thereby the passenger can be prevented effectively from feeling displeasure. Herein, the air permeability of the wind deflector may be configured in such a manner that its air permeability rate increases from the bottom to the top of the wind deflector continuously or stepwise. Also, the lower section of the wind deflector may be configured so as not to have the air permeability (i.e., zero-air permeability rate).

According to another preferred embodiment, the above-described roll bar comprises a pair of projecting portions to project upward at parts thereof corresponding to the driver seat and assistant seat, and the wind deflector is located between the projecting portions.

Herein, the wind deflector having the air permeability tends to show its small rigidity. However, the above-described wind deflector located between the projecting portions of the roll bar can be configured so as to have a sufficient rigidity against the air flow by making its length in the vehicle width direction relatively short, thereby providing the stably-supported wind deflector. Also, the above-described wind deflector can be placed properly by utilizing the space between the projecting portions projecting upward at the parts respectively corresponding to the driver and assistant seats. Also, the wind deflector may be disposed within a dead space which is enclosed by the projecting portions with a specified width in the longitudinal direction of the vehicle, and therefore the space utility can be improved.

According to further another preferred embodiment, the wind deflector comprises a board having through holes.

Accordingly, since the board generally shows its hard characteristics, the wind deflector comprising the board can be made hard enough to prevent properly its inappropriate fluttering caused by the wind pressure of air flow, even if the through holes for the air permeability, which tends to decrease the rigidity, are formed at the board. Also, the wind deflector is configured so as to be somewhat transparent because of the air permeability such as through holes, and therefore in the case where the air permeability rate is configured so as to change over the wind deflector, the outer view of the wind deflector may not be seen uniformly, thereby providing inappropriate outer views of the wind deflector. However, since the board generally has a certain degree of thickness, the above-described problem of transparency can be restrained as much as possible against the wind deflector comprising the board. Namely, even if the board has through holes for the air permeability, the thickness of the board surely reduces an angle range of the person's view which could see behind the board through the holes formed at the board. Accordingly, the degree of transparency of the wind deflector comprising the board is reduced, so that the degree of the outer view of the wind deflector being not seen uniformly can be restrained as much as possible.

According to further another preferred embodiment, a plurality of through holes are formed at the board, and the through holes are configured in such a manner that a size of the holes formed at an upper section of the board is greater than that of the holes formed at a lower section of the board.

Accordingly, since at least the upper section of the board has the larger size of through holes compared to the lower section of the board, the driver can properly obtain sufficiently-clear rear view through the larger holes formed at the upper section of the board even if the wind deflector is provided there.

According to another preferred embodiment, a plurality of through holes having substantially the same size are formed at the board, and the through holes are configured in such a manner that the number of the holes per the unit area which are formed at an upper section of the board is greater than that of the holes which are formed at a lower section thereof of the board.

Accordingly, since the through holes have substantially the same hole size, the degree of transparency of the wind deflector comprising the board changes only according to the angle of the person's view which could see behind the board through the holes formed at the board. In other words, the transparency does not change according to sections of the board, i.e., the transparency will be uniform over a whole section of the board where the holes are formed. As a result, the outer view of the wind deflector can be maintained to be seen uniformly regardless of its sections.

According to further another preferred embodiment, the wind deflector is attached to the roll bar so as to fall forward and/or rearward.

Accordingly, the driver can fall down the wind deflector at need to obtain more clear rear view, for example, when driving the car backward.

According to further another preferred embodiment, the vehicle is configured such that the upper portion thereof above the belt line including a roof is foldable except the windshield so as to be stored, and the roof is configured in a stored state thereof such that an outer face thereof is located behind the driver seat and assistant seat and turns upward and part thereof including a central portion thereof in a vehicle width direction is located above the belt line.

In the case where the upper portion of the open car above the belt line including the roof is configured to be foldable, it is considered preferable that the outer face of the roof folded, which functions as the vehicle roof, is located so as to turn upward. This is because the outer face of roof is exposed to the outside while being folded, thereby providing a good appearance or preventing a roof inner face (i.e., an inside face of roof in the cabin) from getting dirty in the open state of the car. Herein, the roof generally has a shape that its central portion in the vehicle width direction rises upward, and in the case where such a foldable roof is applied, particularly for a so-called hard-roof type of open car, this might provide the driver looking back via the rear view mirror with somewhat inappropriate view of the roof center raising upward when the roof is folded in the open sate of the open car.

In this regard, according to the above-described embodiment in which the wind deflector comprises the board with through holes, and the size of the holes and/or the number of the holes per the unit area which are formed at the upper section of the board are greater than those of the holes which are formed at the lower section of the board, the above-described inappropriate view can be improved properly. Namely, the driver can look backward properly through the holes formed at the upper section of the board of the wind deflector via the rear view mirror, and herein the roof center raising upward in its folded sate can be properly hidden by the lower section of the board of the wind deflector. As a result, an appropriate rear view by the driver can be provided, and this can be attained along with the above-described proper prevention of the air flow coming in.

According to further another preferred embodiment, a rear face of the lower section of the wind deflector comprises an ornamental portion.

Accordingly, the area of the lower section of the wind deflector where there are provided, for example, through holes having the smaller size and/or the smaller number per the unit area becomes a proper ornamental portion when viewed from the rear. Namely, this area of the lower section of the wind deflector having the smaller size and/or the smaller number per the unit area is inherently a portion which may be difficult for the driver to look backward through. Accordingly, this lower section of the wind deflector being as the ornamental portion may not cause any substantial problems for the driver's proper rear view. In other words, the area providing less problems for the driver's proper rear view could be utilized as the ornamental portion. Herein, the ornamental portion includes any kind of designs or indication marks, such as a corporate logo or a vehicle model name.

According to further another preferred embodiment, the wind deflector comprises a first deflector member and a second deflector member which are provided behind the driver seat and assistant seat and above the belt line, wherein the first deflector member is located having a specified clearance from the belt line and the second deflector member is located before the first deflector member so as to direct the air flow passing through the specified clearance upward.

Accordingly, since the air flow coming from the vehicle rear is allowed to pass actively through the clearance formed between the first deflector member and the belt line of the vehicle, the air flow coming in beyond the wind deflector can be reduced properly. Also, the air flow coming through the clearance is directed upward by the second deflector member located before the first deflector member and behind the passenger and assistant seats. As a result, the air flow coming from the vehicle rear during the open-state driving can be properly prevented from coming into the cabin, specifically in the vicinity of the passenger's head before the wind deflector.

According to further another preferred embodiment, the roll bar comprises the pair of projecting portions to project upward at parts thereof corresponding to the driver seat and assistant seat, and the first and second deflector members are located between the projecting portions.

Accordingly, the first and second deflector members can be placed properly by utilizing the space between the projecting portions projecting upward at the parts respectively corresponding to the driver and assistant seats. Namely, the respective deflector members are disposed within the so-called dead space between the projecting portions, and therefore the space utility can be improved. Also, the respective deflector members' length in the vehicle width direction may be made short by the above-described disposition of the deflect members, which could increase the rigidity of the respective deflector members themselves. Accordingly, it may not be necessary to add to the deflector members other particular structure to ensure an enough rigidity of the deflector members to bear the wind pressure. As a result, the structure of deflector members can be simplified. Further, the air flow coming from the vehicle rear between the projections of the roll bar can be properly prevented from coming into the cabin by the first and second deflector members.

According to further another preferred embodiment, the roll bar includes a horizontal portion to substantially horizontally interconnect the pair of projecting portions at substantially the same level as the belt line, and the second deflector member is provided so as to contact with an upper face of the horizontal portion of the roll bar.

Accordingly, there can be provided substantially no clearance between the second deflector member and the horizontal portion of the roll bar, so that the function of the second deflector member to direct the air flow coming through the clearance below the first deflector member upward can be attained effectively.

According to further another preferred embodiment, the second deflector member is formed integrally at least with the horizontal portion of the roll bar.

Accordingly, since no clearance can be substantially provided between the second deflector member and the horizontal portion of the roll bar member and a proper shape to direct the air flow upward can be provided to the second deflector member, the function of the second deflector member to direct the air flow upward can be attained further effectively.

According to further another preferred embodiment, the first deflector member is configured so as to have the air permeability to allow part of the air flow to pass therethrough.

Accordingly, since the first deflector allows part of air flow coming from the vehicle rear to pass through it without shutting off the air flow fully, part of air flow which flows beyond the upper of the first deflector member can be reduced. Also, the air flow directed by the second deflector member can be surely directed upward by the air flow passing through the first deflector member, and therefore the upward-direction control of the air flow behind the passenger can be facilitated.

Herein, the first deflector member may comprise a mesh material or a board with through holes which is formed of resin.

Other features, aspects and advantages of the present invention will become apparent from the following description which refers to the accompanying drawings.

DETAILED DESCRIPTION OF THE INVENTION

Preferred embodiments of the present invention will be described referring to the accompanying drawings. It should be understood that even though embodiments are separately described, single features thereof may be combined to additional embodiments.

First, first through third embodiments of the present invention will be described referring to FIGS. 1 through 5. A common structure of these embodiments will be described referring FIGS. 1 through 3.

Figure 1:
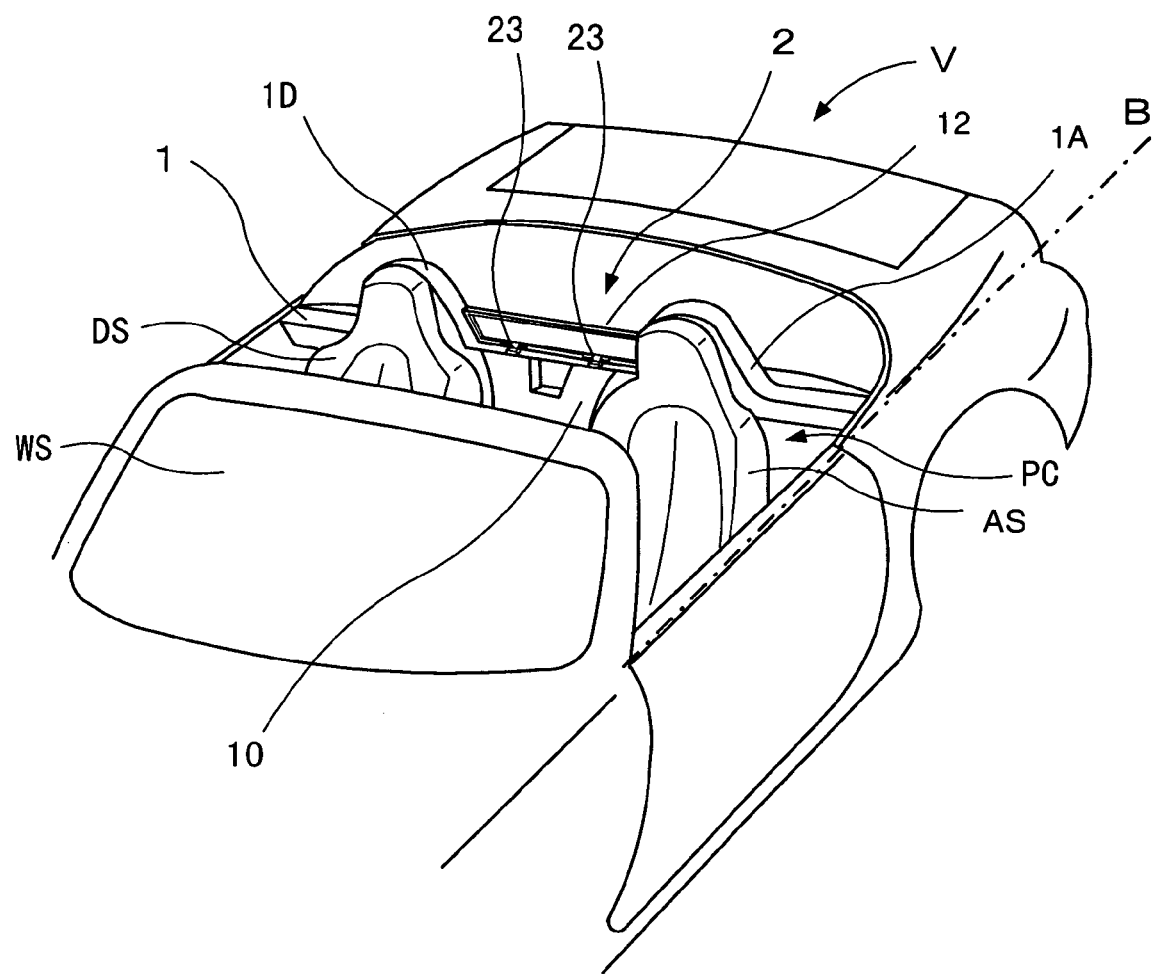
FIG. 1 is a perspective view illustrating around a cabin of an open car equipped with a wind deflector in its open state according to an embodiment of the present invention.

FIG. 1 is a perspective view illustrating around a cabin PC of a vehicle V (open car) equipped with a wind deflector according to the present invention, and illustrates an open state of the vehicle in which its upper portion, including a roof panel, above a belt line B of the vehicle V except a windshield WS is stored behind the cabin PC. The vehicle V is a two-seater type of vehicle, which includes a driver seat DS and an assistant seat AS in the cabin PC. Herein, the belt line B means an upper end portion of the door and a portion of a vehicle body behind the door which is located at the level of the door's upper end in the open state of the vehicle V. Also, when the vehicle V of the present embodiment is in the open state, the height of the door's upper end is almost the same as the height of an upper face of the vehicle body located behind the driver seat DS and the assistant seat AS. Further, the cabin PC means an area which is substantially located behind the windshield WS, before a head portion of a passenger sitting and below the level of the driver's head portion.

There is provided a roll bar 1 behind the driver seat DS and the assistant seat AS. The roll bar 1 comprises a pair of projecting portions 1D and 1A to project upward at parts thereof corresponding to the driver seat DS and assistant seat AS. A wind deflector 2 is attached via hinges 23 to a horizontal portion 10 which is horizontally interconnecting the projecting portions 1D and 1A of the roll bar 1. This wind deflector 2 functions as a member to deflect an air flow coming from the vehicle rear during the open-state driving in such a manner that the air flow is prevented from coming in through a space between the driver seat DS and the assistant seat AS, so that the passenger can be prevented properly from feeling displeasure. The wind deflector 2, whose details will be described below, comprises a board which is made of resin, and a plurality of through holes are formed over its whole area so as to allow part of the air flow coming from the vehicle rear through the wind deflector 2. Namely, the wind deflector 2 according to the present invention has air permeability to allow part of the air flow coming from the vehicle rear therethrough (an illustration of the through holes is omitted in FIGS. 1 through 3).

Figure 2:
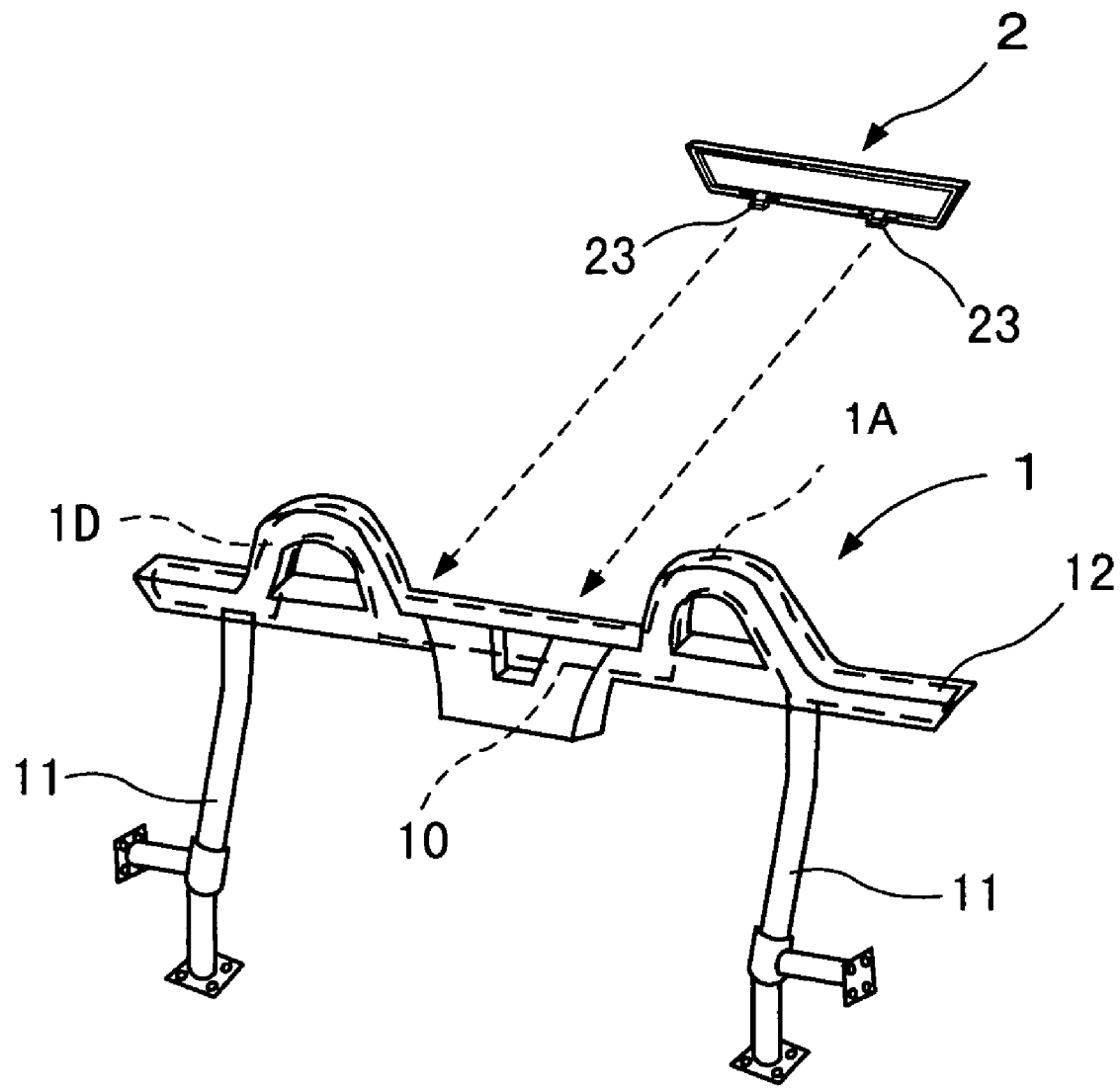
FIG. 2 is an exploded perspective view of an assembly of a roll bar and the wind deflector according the present embodiment.

FIG. 2 is an exploded perspective view of an assembly of the roll bar 1 and the wind deflector 2. The roll bar 1 is of two-mountain shape, comprising the projecting portions 1D and 1A to project upward at parts thereof corresponding to the driver seat DS and assistant seat AS, as described above. Specifically, it comprises leg portions 11 located at substantially both ends thereof in the vehicle width direction, the horizontal portion 10 interconnecting these leg portions 11 at the level of the belt line B of the vehicle V, and the above-described projecting portions 1D and 1A projecting upward at parts thereof corresponding to the driver seat DS and assistant seat AS. The leg portions 11 are fixed to the vehicle body firmly and both ends of the horizontal portion 10 are securely fixed to the vehicle body. Also, the horizontal portion 10 and the projecting portions 1D and 1A are covered with a trim 12 which is made of resin. The horizontal portion 10 and projecting portions 1D and 1A, which are formed of a hard rigidity member and integrally with the leg portions 11, are covered with the trim 12 at their front and rear portions (portions covered by the trim 12 is illustrated by broken lines in the figure). Namely, the roll bar 1 comprises the leg portions 11, horizontal portion 10, projecting portions 1D and 1A, and trim 12.

The above-described wind deflector 2 is attached to a portion of the trim 12 covering the horizontal portion 10 of roll bar 1. Namely, the wind deflector 2 is attached to the horizontal portion 10 of the roll bar 1 via the above-described hinges 23, and the wind deflector 2 can be positioned so as to fall forward thereby, when needed, for example, during the closed sate of the open car.

Namely, the wind deflector 2 of the present embodiment is attached to the so-called two-mountain-shaped roll bar 1 with projecting portions 1D and 1A projecting upward at its parts corresponding to the driver seat DS and assistant seat AS. Accordingly, the wind deflector 2 can be properly disposed within a so-called dead space formed between the projecting portions 1D and 1A which have a certain degree of thickness in the longitudinal direction of the vehicle. Also, it can be properly avoided for the wind deflector 2 to interfere with any opening-and-closing movements of the upper vehicle portion above the belt line B of the vehicle. Also, the air flow coming from the vehicle rear which will flow down between the driver seat DS and the assistant seat AS can be effectively shut off by the wind deflector 2 located between the projecting portions 1D and 1A. Also, the wind deflector 2 disposed between the projecting portions 1D and 1A can be configured such that its length in the vehicle width direction becomes short properly.

Figure 3:
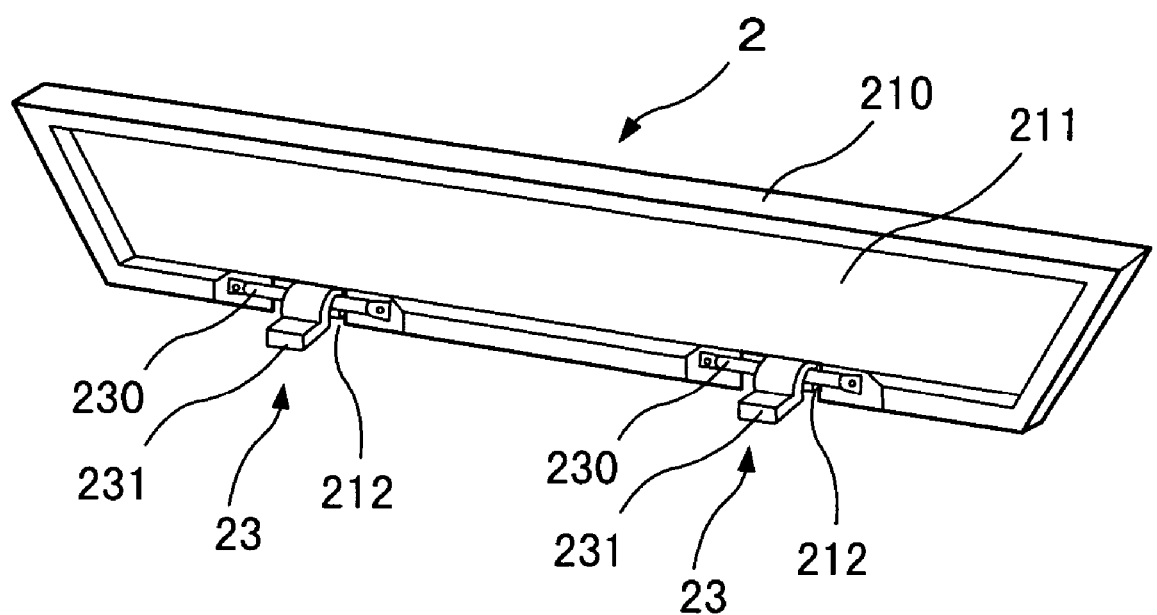
FIG. 3 is a perspective view illustrating the wind deflector and hinges according to the present embodiment.

Next, a structure of the hinge 23 for attaching the wind deflector 2 to the trim 12 of the roll bar 1 will be described referring to FIG. 3. The wind deflector 2 is made of resin, which includes a surrounding frame section 210 and an inside board-shaped body section 211. These frame section 210 and body section 211 are formed integrally with each other when being manufactured. At the body section 211 are provided the above-described through holes over its whole area (not illustrated in FIG. 3), which are also formed at the same time the sections 210 and 211 are manufactured. These through holes are configured in such a manner that the size of the holes formed at an upper section of the wind deflector 2 is greater than that of the holes formed at a lower section of the wind deflector 2, so that its upper section can allow the air flow to pass through more smoothly than its lower section (i.e., the upper section has a greater air permeability rate), which will be described in detail below. Accordingly, when the wind deflector 2 is installed to the vehicle V, the amount of air flow passing through the holes at the upper section of the wind deflector 2 becomes greater than that of air flow passing through the holes at its lower section. The function of the wind deflector 2 having the greater air permeability rate at its upper section and the lower one at its lower section, and disposition of these through holes with different sizes will be described specifically later on. Herein, the amount of air flow passing through the wind deflector is related to the air permeability rate. Namely, the greater the amount of air flow is, the greater the air permeability rate is. Although the wind deflector 2 may be made of a mesh material with the air permeability, the board with through holes which is made of resin is more preferable to the wind deflector 2 when the wind deflector 2 having its greater rigidity is needed.

At a lower end of the wind deflector 2 is formed two notches 212 which are provided with a specified interval in the vehicle width direction. And, two shafts 230 are attached beyond the respective notches 212, which constitute rotational axes for the hinges 23. Also, there are provided supports 231 to rotatably support the shafts 230, which are fixed to an upper face of the roll bar 1, specifically an upper face of the trim 12. Accordingly, the wind deflector 2 is attached to the roll bar 1 so as to rotate around the shafts 230 at the supports 231. Namely, the shafts 230 and the supports 231 constitute the hinges 23 for supporting the wind deflector 2.

The hinges 23 are configured so as to hold the wind deflector 2 on the roll bar 1 in its substantially upright position and its forward fallen position, allowing the rotation of the wind deflector 2. This constitution of the hinges 23 can be attained by using a conventional structure used for an attachment of a sun visor. Rotating the wind deflector 2 from its upright position to its forward fallen position can provide the driver with a more clear rear view when driving the vehicle V in its closed-roof state or driving the vehicle backward in its open-roof sate. Herein, the wind deflector 2 may be configured so as to rotate backward instead of forward, or in both directions.

Figure 4A:
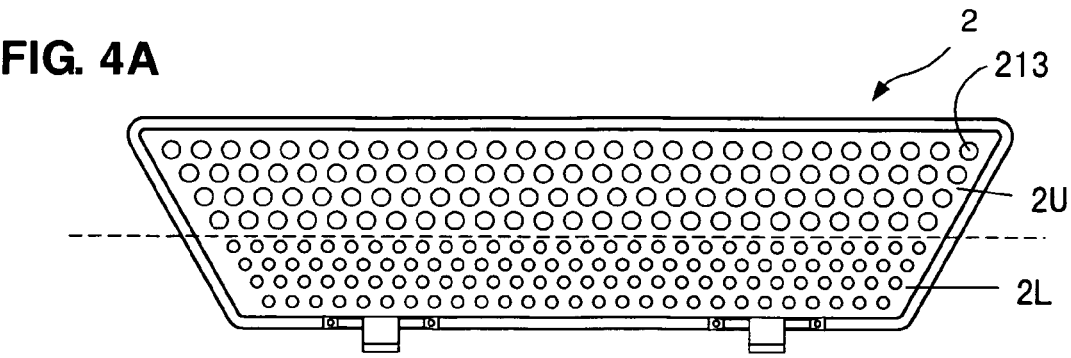
FIGS. 4A, 4B and 4C are schematic diagrams illustrating respective dispositions of through holes having different air permeability rates, which are formed at upper and lower sections of the deflector.

Exemplified dispositions of the through holes 213 formed the wind deflector 2 are illustrated in FIGS. 4A though 4C, as the first through third embodiments of the present invention. Only one through hole is just denoted by reference numeral 213 simply in these figures. The first embodiment of FIG. 4A comprises the through holes 213, in which the size of the holes formed at the upper section 2U of the wind deflector 2 is greater than that of the holes formed at its lower section 2L, and a distance between respective edges of adjacent holes is constant. This disposition of the through holes 213 can provide a greater total-hole-opening area at the wind deflector 2, result in a properly clear rear view of the driver through the holes 213 of the wind deflector 2. Such a clear rear view will be obtained particularly through the through holes 213 with the large hole size formed at the upper section 2U of the wind deflector 2.

Figure 4B:
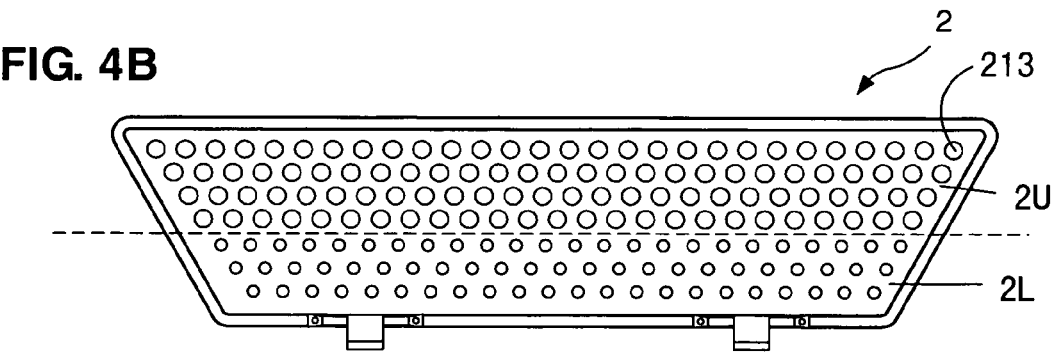

The second embodiment of FIG. 4B comprises the through holes 213, in which the size of the holes formed at the upper section 2U of the wind deflector 2 is greater than that of the holes formed at its lower section 2L, and a distance between respective centers of adjacent holes is constant (i.e., the number of the holes per the unit area formed at the upper section 2U is the same as that of the holes formed at the lower section thereof 2L). This disposition of the through holes 213 can facilitate manufacturing of molds for resin molding of the wind deflector 2 where the through holes 213 are made concurrently.

Figure 4C:
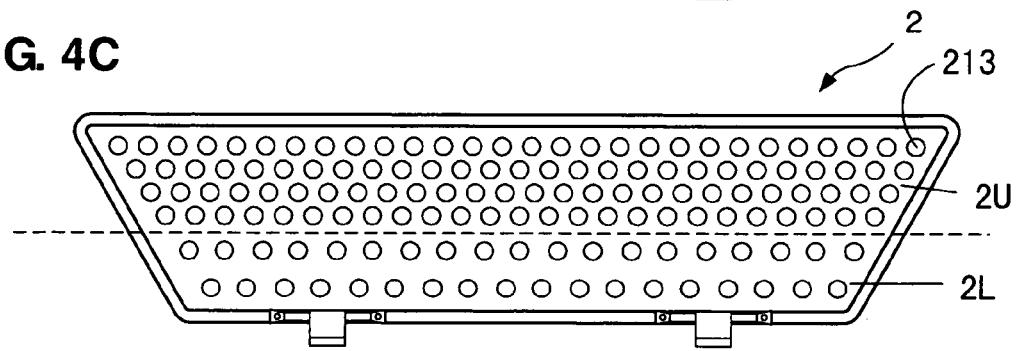

Further, the through holes 213 can be configured as illustrated in FIG. 4C (the third embodiment) such that the hole size is constant, instead of the through holes having its different sizes described above, and a distance between adjacent holes formed in the upper section 2U of the wind deflector 2 is greater than that of holes formed in its lower section 2L (i.e., the number of the holes per the unit area formed at the upper section 2U is greater than that of the holes formed at the lower section 2L). This disposition of the through holes 213 can improve a problem that the outer view of the wind deflector 2 might not be maintained to be seen uniformly due to different degrees of transparency occurring over the area of wind deflector 2, which is caused by different sizes of the through holes formed at the wind deflector 2 having with a certain degree of thickness.

The disposition of the wind deflector 2 between the projecting portions 1D and 1A of the roll bar 1 can provide the wind deflector 2 having its shorter length in the vehicle width direction, so that the wind deflector 2 can be supported stably without any additional devices to increase the rigidity of the wind deflector 2.

Figure 5A:
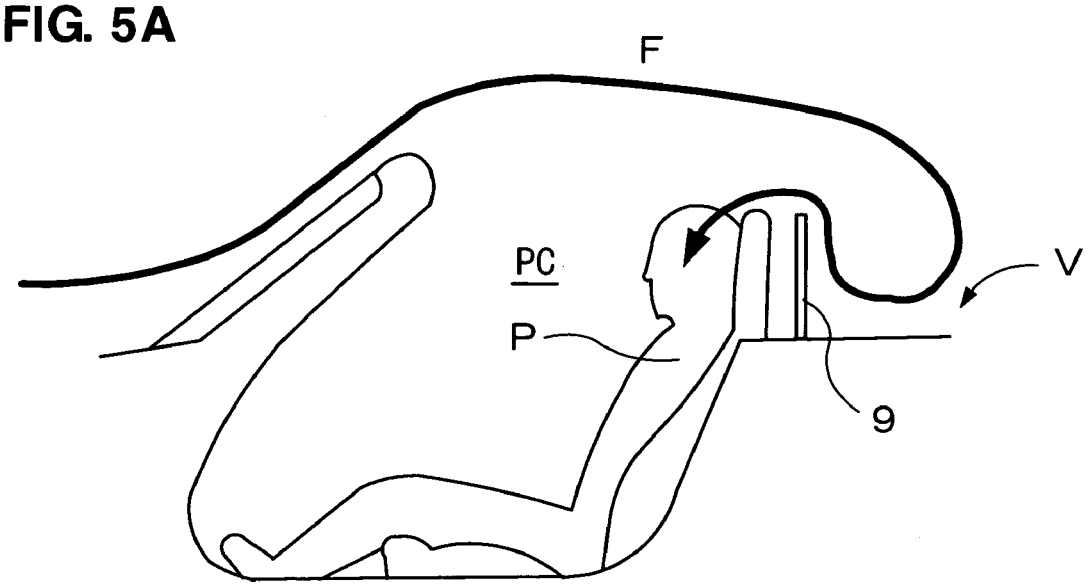
FIGS. 5A and 5B are schematic diagrams respectively illustrating function of a conventional wind deflector and the wind deflector according to the present embodiment.
Figure 5B:
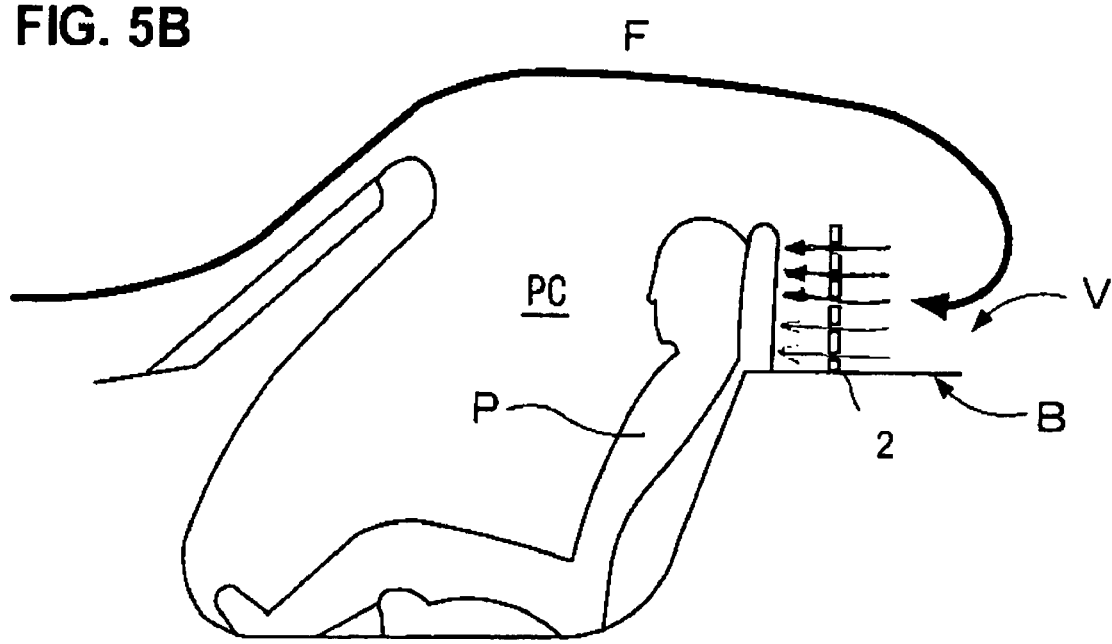

Subsequently, function and effects of the wind deflector 2 having the greater air permeability of the upper section 2U will be described referring to FIGS. 5A and 5B. FIG. 5A schematically illustrates a stream of air flow F occurring during the open-sate driving of the open car equipped with a conventional wind deflector 9 (deflector without any through holes), whereas FIG. 5B schematically illustrates a stream of air flow F occurring during the open-sate driving of the open car equipped with the wind deflector 2 according to the first embodiment as an example. Herein, FIGS. 5A and 5B illustrate respectively around the wind deflector, omitting illustration of the roll bar.

In the case where the conventional wind deflector 9 is used as illustrated in FIG. 5A, upper part of the air flow F, which have come from the vehicle rear and hit the wind deflector 9, comes into the cabin PC beyond an upper end of the wind deflector 9. This part of air flow F flows in almost at the level of ears of a passenger P.

Meanwhile, in the case where the wind deflector 2 of the present invention is used as illustrated in FIG. 5B, part of the air flow, which have come from the vehicle rear and hit the wind deflector 2, passes through the holes formed at the wind deflector 2. Herein, since the hole size of the through holes at the lower section of the wind deflector 2 is smaller than that of the through holes at the upper section, the amount of the air flow passing through the lower section 2L which is directed toward the relatively sensitive neck portion becomes less than that of the air flow passing through the upper section 2U. Accordingly, the air flow toward the relatively sensitive heck portion is suppressed (reduced), and thereby the passenger's feeling displeasure due to the air flow can be effectively suppressed. Also, since the wind deflector 2 allows the air flow to pass therethrough, the air flow which will come in beyond the wind deflector 2 is reduced. Herein, the wind deflectors according to the second and third embodiments illustrated in FIGS. 4B and 4C also perform similar function and effects to the above-described wind deflector 2 of the first embodiment.

Namely, according to the wind deflector 2 of the first through third embodiments of the present invention, since the wind deflector 2 allows the air flow to pass therethrough and the upper section of the wind deflector 2 comprises its upper section with the greater air permeability rate, the part of the air flow coming forward beyond the wind deflector 2 can be reduced. Thereby, both the reducing of the air flow coming in forward beyond the wind deflector and the suppressing of the passenger feeling displeasure with the air flow (against the neck portion) can be attained, and thereby the passenger can be prevented effectively from feeling displeasure.

In the above-described embodiments, as apparent from the above-described description, the through holes 213 formed at the wind deflector 2 constitute a passing device operative to allow the air flow coming to pass therethrough, and the structure of the upper section 2U and lower section 2L of the wind deflector 2 having respective different air permeability rates (the air permeability of the upper section 2U is greater than that of the lower section 2L) constitutes an air-flow adjusting device.

Herein, the through holes 213 may be also formed at the body section 211 such that their hole axes are directed upward along the air flow direction. In this case, the through holes 213 itself function to direct the air flow passing therethrough upward, so that the air flow passing through the holes 213 can be directed upward further properly. Thereby, the suppressing of the passenger feeling displeasure with the air flow (against the neck portion) can be attained further effectively. Also, although the wind deflector 2 described above comprises two kinds of air permeability rates of the upper and lower sections 2U and 2L, it may comprise three or more kinds of air permeability rates of sections. Further, the wind deflector 2 may be alternatively configured so that the air permeability rates substantially change continuously instead of changing stepwise.

Next, the fourth embodiment of the present invention will be described referring to FIGS. 6 through 11.

Figure 6:
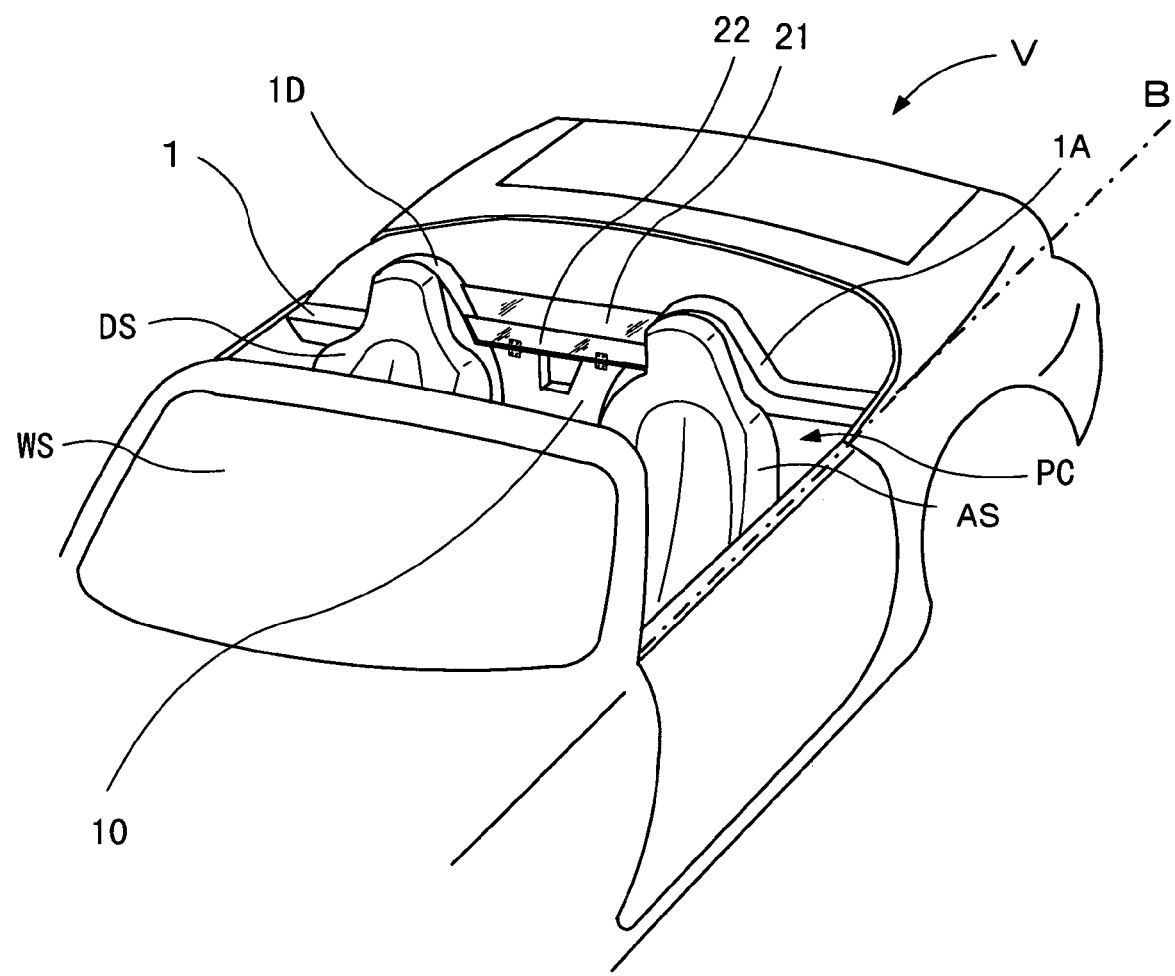
FIG. 6 is a perspective view illustrating around the cabin of the open car equipped with a wind deflector in its open state according to another embodiment of the present invention.

FIG. 6 is a perspective view illustrating around the cabin PC of the vehicle V (open car) equipped with a wind deflector according to the present invention. The structure except the wind deflector is the same as that of the first through third embodiments illustrated in FIG. 1, and therefore the same structure is denoted by the same reference characters and detailed descriptions on those are omitted here.

The wind deflector comprised of a first deflector member 21 and a second deflector member 22, which deflects the air flow coming from the vehicle rear to prevent the driver from feeling displeasure during the open-state driving, is attached to the horizontal portion 10 interconnecting the projecting portions 1D and 1A of the roll bar 1. The first deflect member 21 is located in front, the second deflector member 22 is located in rear, and these both are configured so as to shut off the air flow and located above the belt line B of the vehicle V. A clearance C (not illustrated in FIG. 1) is formed between the first deflector member 21 and the roll bar 1, i.e., between the first deflector member 21 and the belt line B of the vehicle body, and the second deflector member 22 is located so as to overlap with this clearance C, when viewed horizontally. The clearance C allows the air flow coming from the vehicle rear to pass forward actively, and then the second deflector member 22 directs the passing air upward. Herein, the second deflector member 22 is attached to the roll bar 1 with substantially no clearance therebetween, unlike the first deflector member 21.

Figure 7:
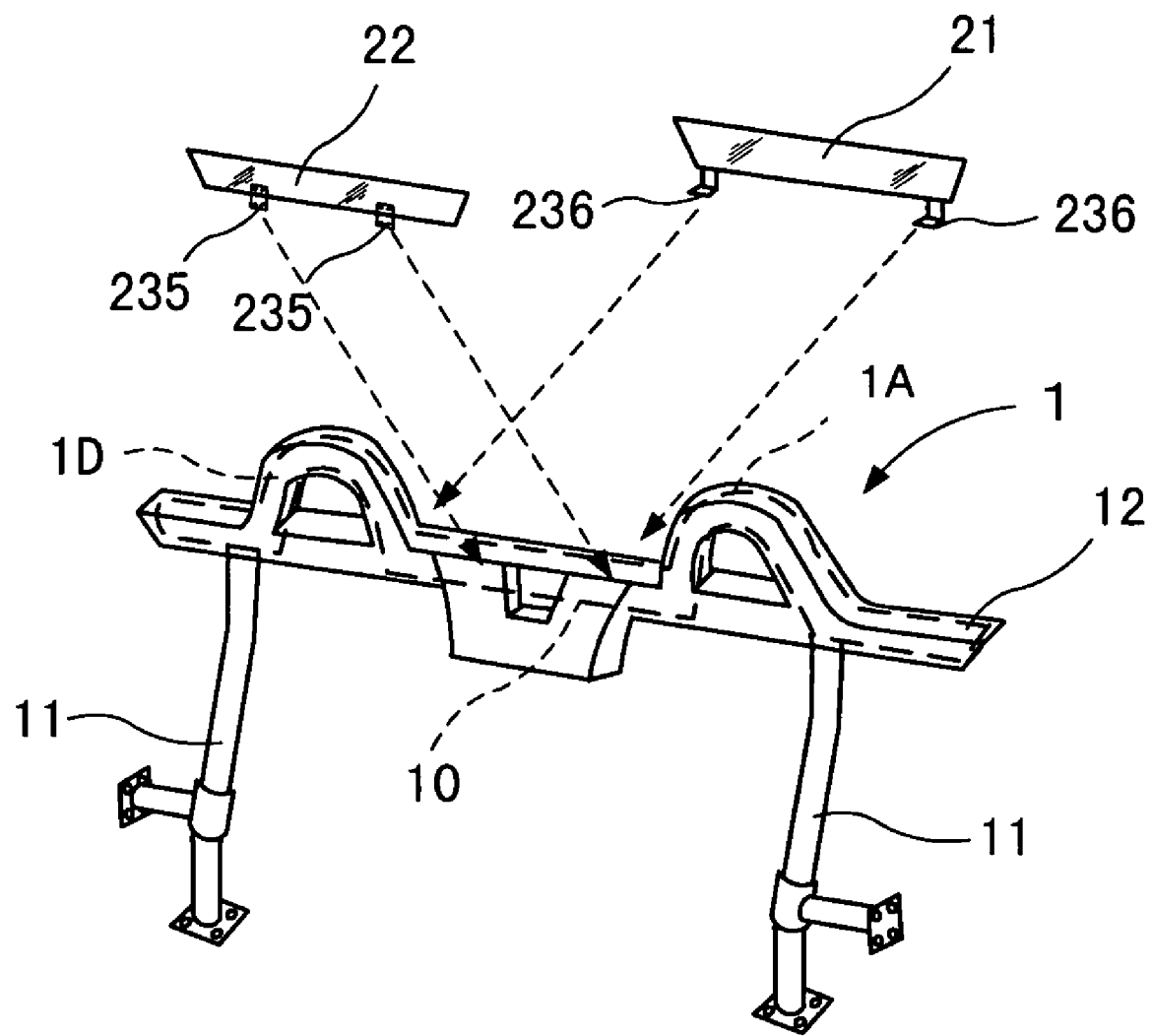
FIG. 7 is an exploded perspective view of an assembly of the roll bar and the wind deflector according the above-described embodiment.

FIG. 7 is an exploded perspective view of an assembly of the roll bar 1 and the deflector members 21 and 22. The roll bar 1 comprises the leg portions 11, horizontal portion 10, projecting portions 1D and 1A and trim 12, like the first through third embodiments, which is substantially the same as one illustrated in FIG. 2 and denoted herein by the same reference characters omitting any further detailed descriptions on those accordingly.

At the portion covering the horizontal portion 10 of the trim 12, i.e., the horizontal potion of the roll bar 1, are attached the above-described first and second deflector members 21 and 22. These deflector members 21 and 22 are attached respectively to the horizontal portion 10 of the roll bar 1 via hinges 236 and 235, so that they can be fallen down when they are not needed, e.g., in the closed state of the open car V. These hinges 236 and 235 are materialized by the same structure as the one of the above-described first through third embodiments, and specific descriptions on these are omitted here accordingly.

Figure 8:
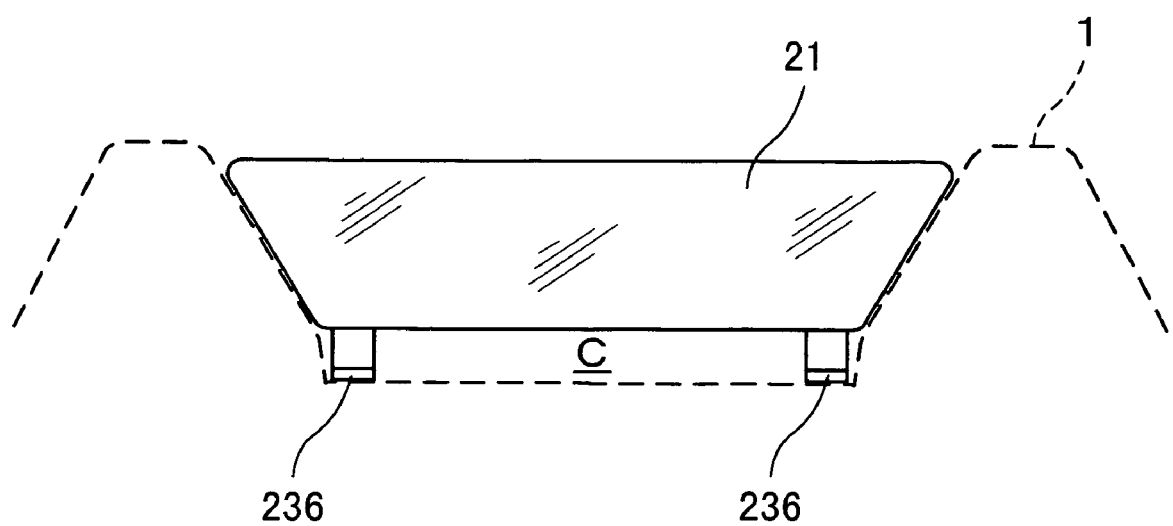
FIG. 8 is an elevation view illustrating around an attaching portion of a first deflector member.

FIG. 8 is an elevation view illustrating around an attaching portion of the first deflector member 21. The hinges 236 to attach the first deflector member 21 to the roll bar 1, as illustrated in FIG. 8, have a specified height to provide the above-described clearance C between the first deflector member 21 and the roll bar 1. Meanwhile, the hinges 235 to attach the second deflector member 22 to the roll bar 1 are configured so as no to provide any substantially clearance between the second deflector member 22 and the roll bar 1 (the second deflector member 22 and the hinges 235 for attaching it to the roll bar 1 are omitted from being illustrated in FIG. 8).

Figure 9A:
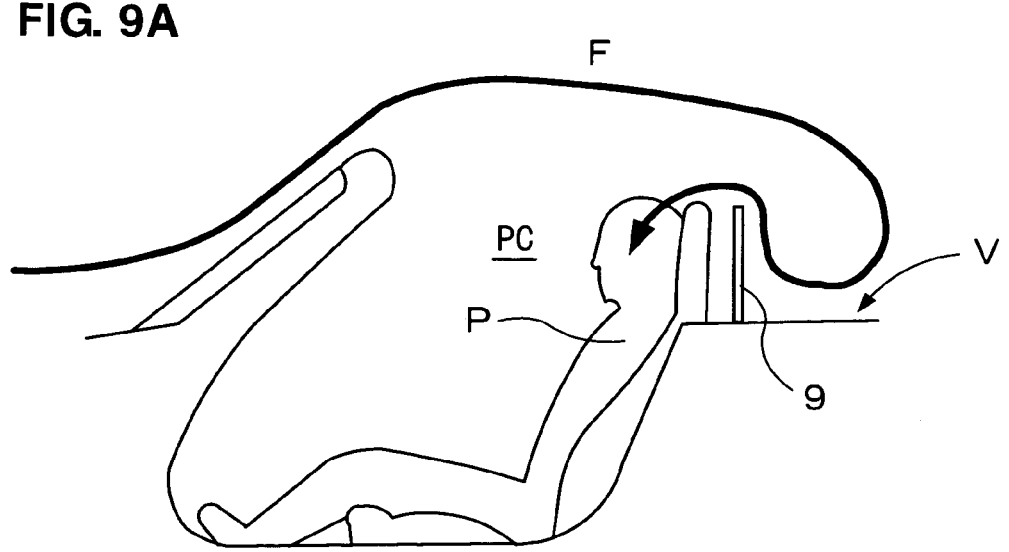
FIGS. 9A and 9B are schematic diagrams respectively illustrating function of the conventional wind deflector and the wind deflector according to the above-described embodiment.
Figure 9B:
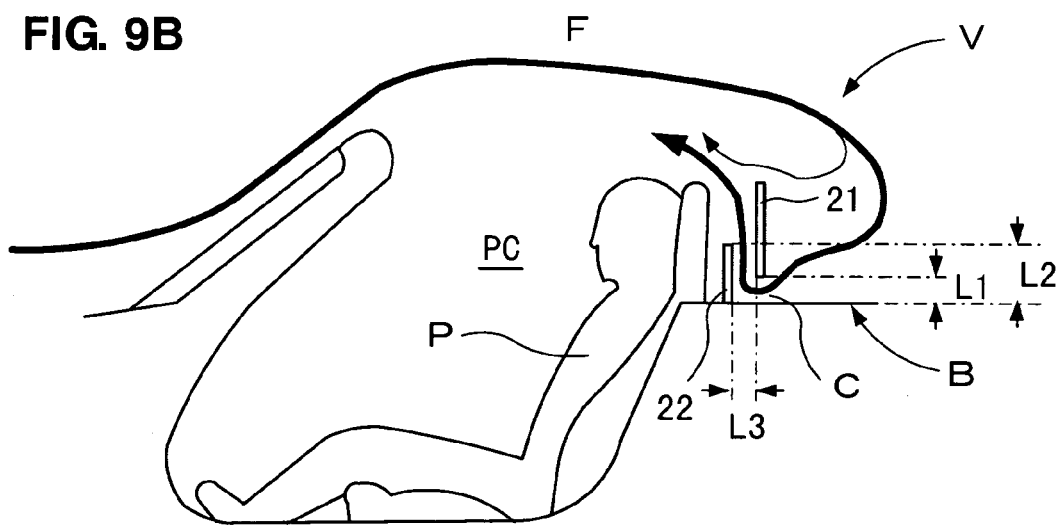

Next, the function of the wind deflector of the present embodiment will be described referring to FIGS. 9A and 9B. FIG. 9A schematically illustrates the stream of air flow F occurring during the open-sate driving of the open car equipped with the conventional wind deflector 9 (single wind deflector 9 provided above the belt line of the vehicle V), whereas FIG. 9B schematically illustrates a stream of air flow occurring during the open-sate driving of the open car equipped with the deflector members 21 and 22 according to the present embodiment. Herein, FIGS. 9A and 9B illustrate respectively around the deflector members, omitting illustration of the roll bar.

In the case where the conventional wind deflector 9 is used as illustrated in FIG. 9A, upper part of the air flow F which have come from the vehicle rear and hit the wind deflector 9 comes into the cabin PC beyond the upper end of the wind deflector 9. This part of air flow F flows in almost at the level of ears of a passenger P.

Meanwhile, in the case where the deflector members 21 22 of the present embodiment are used as illustrated in FIG. 9B, part of the air flow F passes through the clearance C formed between the rear-located first deflector member 21 and the horizontal portion 10 of the roll bar 1 (not illustrated in FIG. 9A). Namely, the air flow F is allowed to pass through below the first deflector member 21 actively, and part of the air flow coming forward beyond the first deflector member 21 is reduced thereby.

The air flow F having passed through the clearance C hits the second deflector member 22 and then is directed upward. Namely, the second deflector member 22 is provided so as to overlap with the clearance C and direct the air flow F upward. Accordingly, since the air flow F coming from the vehicle rear is allowed to pass actively through the clearance C formed below the first deflector member 21, the part of air flow coming forward beyond the first deflector member 21 can be reduced properly. Also, the air flow F coming through the clearance C is directed upward by the second deflector member 22, without hitting the passenger. Further, part of the air flow F coming in beyond the first deflector member 21, if there exists, may be directed upward together with and by the directed air flow by the second deflector member 22. In the present embodiment, the clearance C constitutes the passing device operative to allow the air flow coming to pass therethrough, and the second deflector member 22 constitutes the air-flow-direction changing device.

The inventors of the present invention have found that the first and second deflector members 21 and 22 having dimensions of 10 mm of L1 (vertical length of the clearance C), 50 mm of L2 (vertical length from a lower end of the clearance C to an upper end of the second deflector member 22) and 10 mm of L3 (distance between the first and second deflector members 21 and 22) perform properly reducing the part of air flow F coming in beyond the first deflector member 21 and effectively directing the air flow passing through the clearance C upward. It seems, however, that these appropriate dimensions change according to the height of the first deflector member 21, the distance between the deflector members 21 and 22 and the driver and assistant seats DS and AS, and/or shapes of the deflector members 21 and 22.

The first and second deflector members 21 and 22 of the present embodiment are attached to the so-called two-mountain-shaped roll bar 1 having the projecting portions 1D and 1A to project upward at parts thereof corresponding to the driver seat DS and assistant seat AS, like ones of the above-described first through third embodiments. Likewise, the first and second deflector members 21 and 22 can be properly disposed within the so-called dead space formed between the projecting portions 1D and 1A of the two-mountain-shaped roll bar 1, which have the certain degree of thickness in the longitudinal direction of the vehicle. Also, it can be properly avoided for the first and second deflector members 21 and 22 to interfere with any opening-and-closing movements of the upper vehicle portion above the belt line of the vehicle. Further, the air flow F, which will flow primarily between the driver and assistant seats DS and AS, can be directed effectively by the first and second deflector members 21 and 22. Also, the length of these deflect members 21 and 22 being disposed between the projecting members 1D and 1A will be short in the vehicle width direction. Accordingly, these members 21 and 22 may not need any additional structure to increase rigidity thereof, resulting in simple structure of members.

Herein, the second deflector member 22 may be formed integrally at the trim 12, member of the roll bar 1, instead of being attached to the upper face of the horizontal portion 10 of the roll bar 1 via the hinges 235 like the above-described embodiment. In this case, the second deflector member 22 could be formed in a shape which is so appropriate to direct the air flow more easily. Alternatively, the deflector members 21 and 22 may be attached detachably instead of pivotally via the hinges 236 and 235.

Further, the first deflector member 21 may be configured so as to have some air permeability in place of the deflector member shutting off the air flow of the above-described embodiment. Hereinafter, such exemplified first deflector members will be described as fifth and sixth embodiments, referring to FIGS. 10 and 11.

Figure 10A:
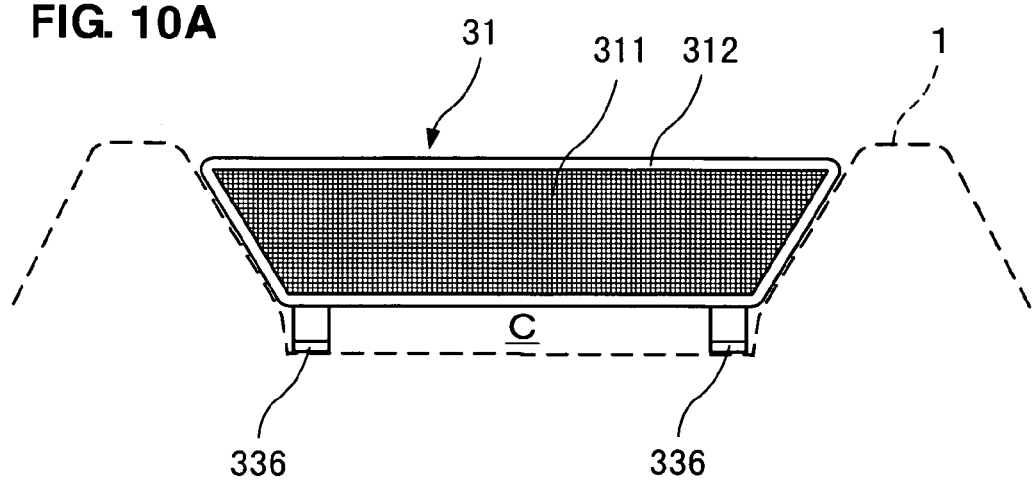
FIG. 10A is an elevation view illustrating a first deflector member according to further another embodiment of the present invention.

FIG. 10A is an elevation view illustrating around an attaching portion of a first deflector member 31 according to the fifth embodiment. The first deflector member 31 is substantially the same as one of the fourth embodiment except its comprising a mesh material 311 having air permeability and a frame portion 312. Namely, the first deflector member 31 is attached to the upper face of the horizontal portion 10 of the roll bar 1 with the clearance C formed therebetween. The second deflector member is provided on the roll bar 1 so as to contact it (the second deflector member is omitted from being illustrated in FIG. 10A).

Figure 10B:
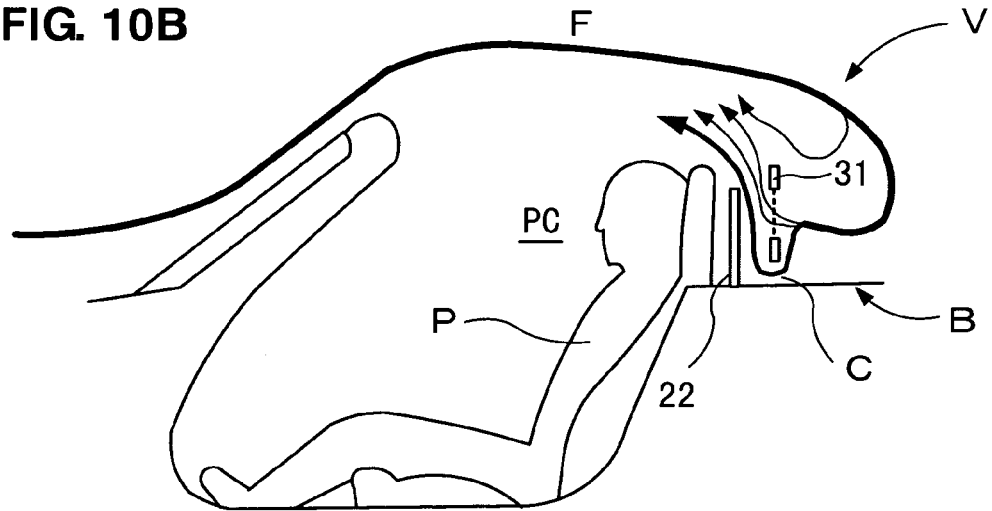
FIG. 10B is schematic view illustrating function of this first deflector member.

FIG. 10B schematically illustrates a stream of air flow F occurring during the open-sate driving of the open car according to the fifth embodiment. FIG. 10B illustrates around the attaching portion of the wind deflector without the roll bar. Since the first deflector member 31 is substantially comprised of the mesh material having air permeability, part of air flow F is allowed to pass therethrough without being shut off, as illustrated in the figure. Accordingly, much part of air flow F can be passed through in addition to the clearance C, and therefore part of the air flow F coming in beyond the first deflector member 31 will be further reduced. Also, the second deflector member 22 directs the air flow F passing through the clearance C upward surely. Also, part of the air flow F coming in beyond the first deflector member 31, if there exists, can be directed upward together with and by the directed air flow by the second deflector member 22, without coming into the cabin PC.

Figure 11A:
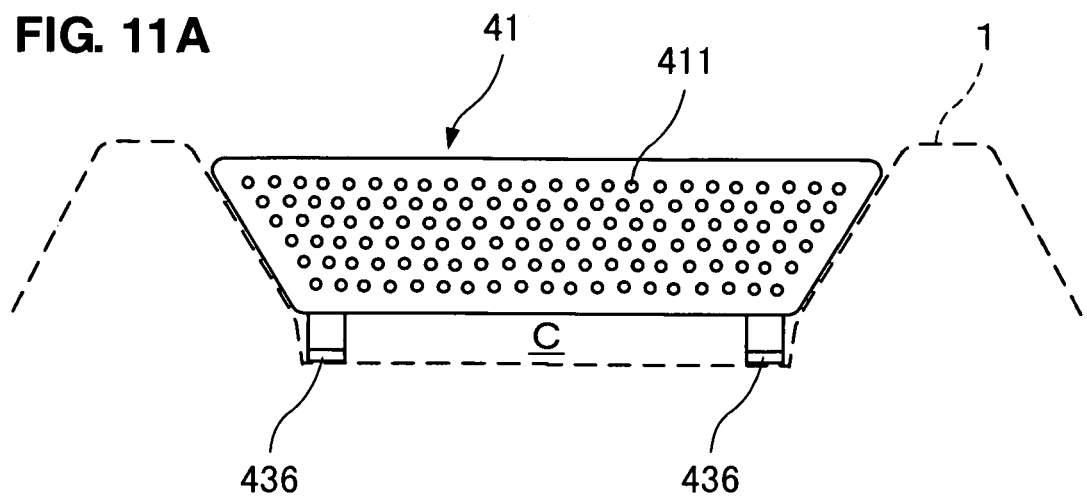
FIG. 11A is an elevation view illustrating a first deflector member according to further another embodiment of the present invention.

FIG. 11A is an elevation view illustrating around an attaching portion of a first deflector member 41 according to the sixth embodiment. The first deflector member 41 is substantially the same as one of the fifth embodiment except its comprising a resin plate at which through holes 411 with a specified hole size are formed uniformly. Namely, the first deflector member 41 is attached to the upper face of the horizontal portion 10 of the roll bar 1 with the clearance C formed therebetween. The second deflector member is provided on the roll bar 1 so as to contact it (the second deflector member is omitted from being illustrated in FIG. 11A, and only one through hole is just denoted by reference numeral).

Figure 11B:
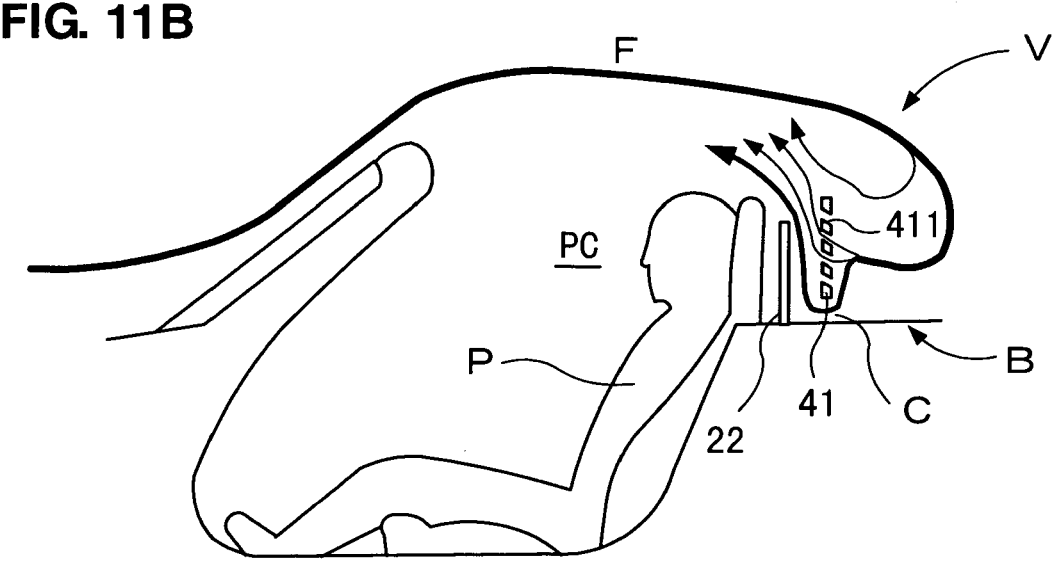
FIG. 11B is schematic view illustrating function of this first deflector member.

FIG. 11B schematically illustrates a stream of air flow F occurring during the open-sate driving of the open car according to the sixth embodiment. FIG. 11B illustrates around the attaching portion of the wind deflector without the roll bar. Since the first deflector member 41 comprises the uniformly-formed through holes 411 with the specified hole size, part of air flow F is allowed to pass therethrough without being shut off, like the second embodiment. Accordingly, much part of air flow F can be passed through in addition to the clearance C, and therefore part of the air flow F coming in beyond the first deflector member 41 will be further reduced. Also, the second deflector member 22 directs the air flow F passing through the clearance C upward surely. Also, part of the air flow F coming in beyond the first deflector member 41, if there exists, can be directed upward together with and by the directed air flow by the second deflector member 22, without coming into the cabin PC.

Further, the first deflector member 41 of the sixth embodiment necessarily has a cretin degree of thickness. Herein, the through holes 411 may be formed such that their hole axes are directed upward along the air flow (i.e., opening edges of the holes at a front face of the first deflector member 41 are positioned higher than opening edges of the holes at a rear face thereof). Accordingly, the air flow passing through the through holes 411 can be directed upward, and thus the whole air flow passing through the first deflector member 41 can be directed upward further properly, including the air flow passing through the clearance C below the first deflector member 41.

Here, in a case where the upper portion of the open car above the belt line B including the roof is configured so as to be foldable, an outer face of the roof folded which functions as the vehicle roof may be located so as to turn upward. This is preferable because the outer face of roof is exposed to the outside while being folded, thereby providing a good appearance or preventing a roof inner face (i.e., an inside face of roof in the cabin PC) from getting dirty in the open state of the car.

However, the roof generally has a shape that its central portion in the vehicle width direction rises upward, and in the case where such a foldable roof is applied, particularly to a so-called hard-roof type of open car, this might provide the driver who looks back via the rear view mirror with somewhat inappropriate view of the roof center raising upward when the roof is folded in the open sate of the open car. In this regard, the present invention can solve this inappropriate view problem, properly preventing the air follow from coming in during the open-sate driving. Such a constitution will be described as a seventh embodiment referring to FIGS. 12 through 15.

Figure 12:
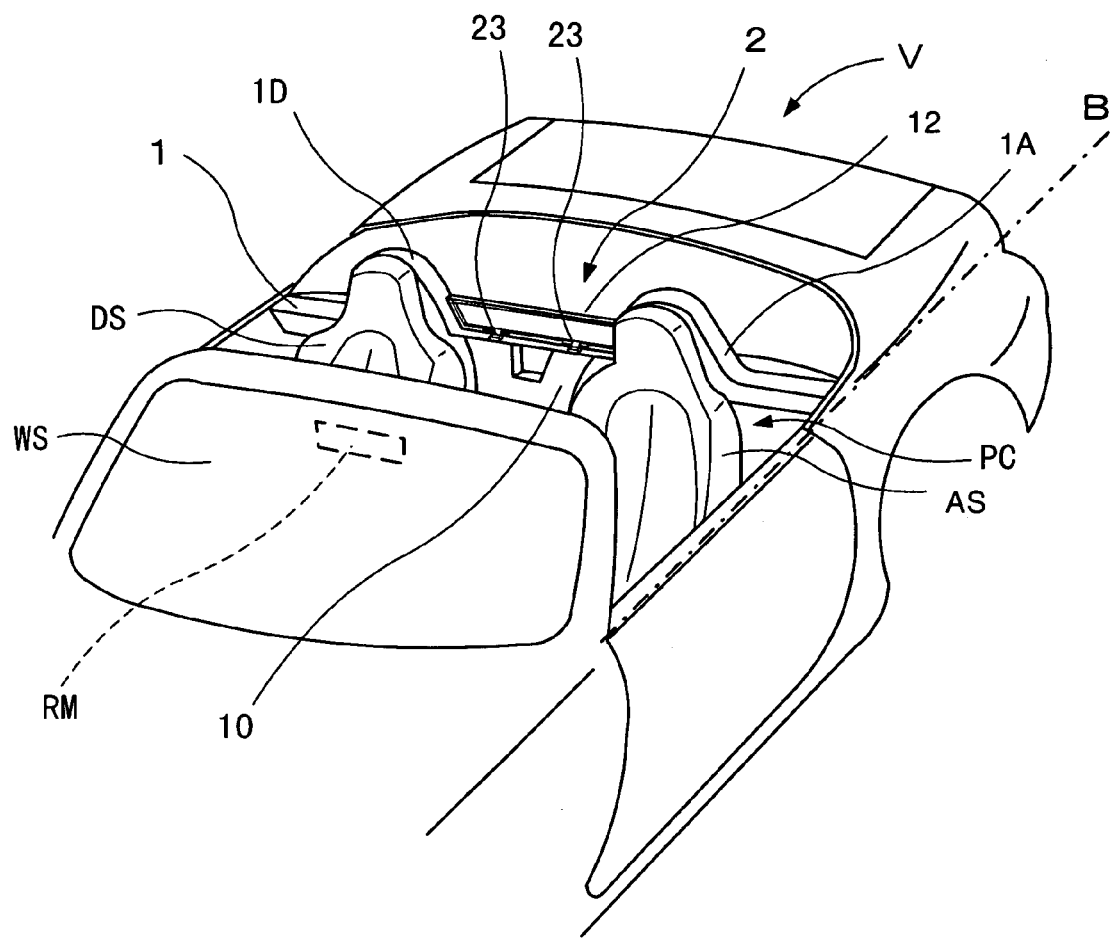
FIG. 12 is a perspective view illustrating around the cabin of the open car equipped with a wind deflector in its open state according to further another embodiment of the present invention.

FIG. 12 is a perspective view illustrating around the cabin PC of the open car V equipped with a wind deflector in its open state according to the sixth embodiment of the present invention. The structure except the wind deflector is the same as that of the first through third embodiments illustrated in FIG. 1, and therefore the same structure is denoted by the same reference characters and detailed descriptions on those are omitted here. A rear view mirror RM to provide a rear view to the driver is illustrated in FIG. 12. The roll bar 1 has the same structure as ones of the first through third embodiments, and detailed description on this is omitted accordingly.

The wind deflector 2 has the same structure as one of the first embodiment illustrated in FIG. 4A. Namely, the hole size of the through holes 213 at the upper section 2U of the wind deflector 2 is greater than that of the through holes 213 at the lower section 2L.

Storing of the upper portion including the roof panel to make the open state of the vehicle V according to the present embodiment will be described referring to FIGS. 13A through 13D. The seats DS and AS, roll bar 1 and deflector 2 are omitted from being illustrated in FIGS. 13 through 13D.

Figure 13A:
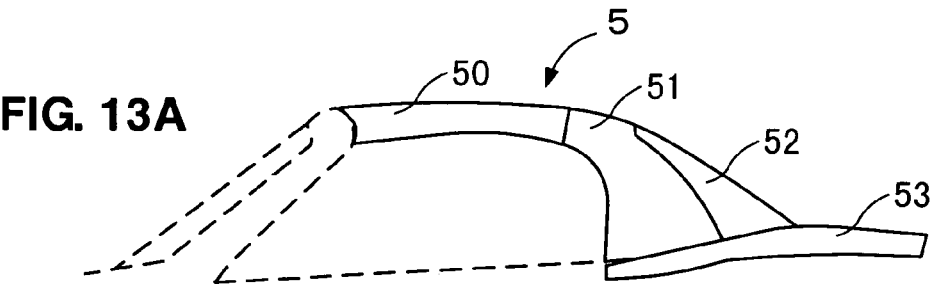
FIGS. 13A–13D are diagrams illustrating a transitional state, from its closed state to its open state, of the open car according to the present invention.
Figure 13B:
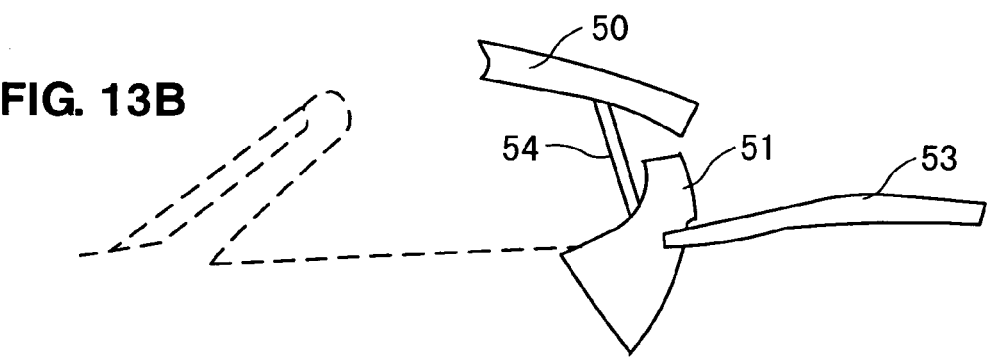
Figure 13C:
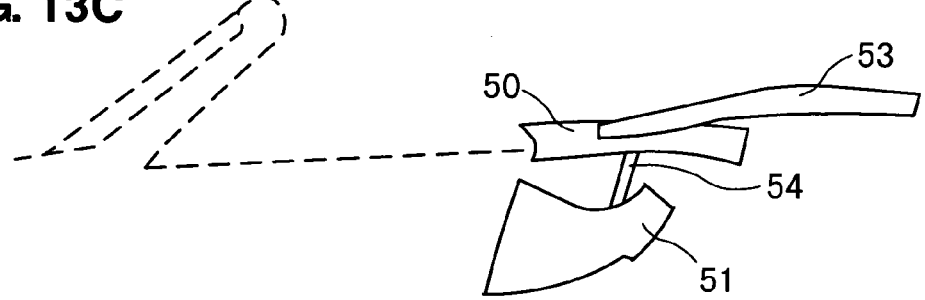
Figure 13D:
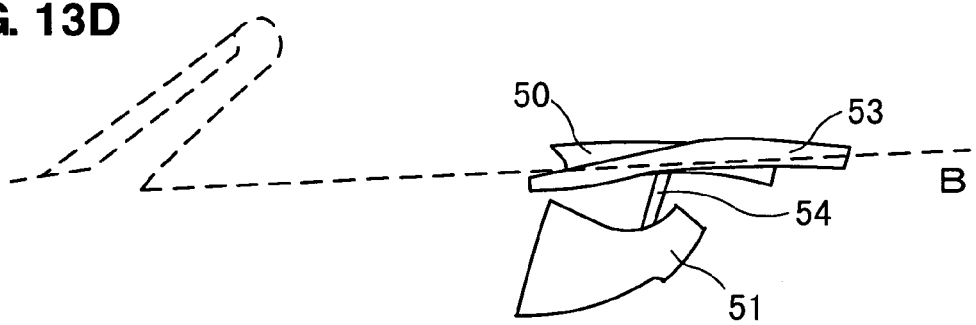

FIG. 13A is a side view of the vehicle V in the closed state, and FIG. 13D is a side view of the vehicle V in the open state. A change from the closed state to the open state goes via states illustrated in FIGS. 13B and 13C. There is provided a storing section to store the upper portion above the belt line B at the rear of the vehicle V, which is omitted from being illustrated here.

An upper portion 5 of the vehicle V above the belt line B, as shown in FIG. 13A, comprises a roof panel 50 made of metal or resin, a rear pillar portion 51 made of metal or resign likewise, and a rear window 52 to constitute a so-called hard roof type of open car. Also, there is provided a cover 53 to cover the storing portion (not illustrated) at the vehicle rear. In order to make the open sate of the vehicle, the cover 53 is moved backward by a specified distance, and then the rear pillar portion 51 is rotated rearward via a linkage mechanism (not illustrated) and the roof panel 50 being supported at the rear pillar portion 51 via a linkage mechanism 54 is moved backward. Herein, the rear window 52 is separate from the rear pillar portion 51 and located inside of the rear pillar portion 51. This state is illustrated in FIG. 13B.

Subsequently, the rear pillar portion 51 is further rotated backward to be stored in the storing portion, and the roof panel 50 is positioned above the rear pillar portion 51 in such a manner that its upper face is located so as to turn upward. This state is illustrated in FIG. 13C. Then, the cover 53 is moved forward, which leads to a completion of the storing of the upper portion of the vehicle above the belt line B, i.e., a completion of a transfer to the open state. This state is illustrated in FIG. 13D.

Figure 14A:
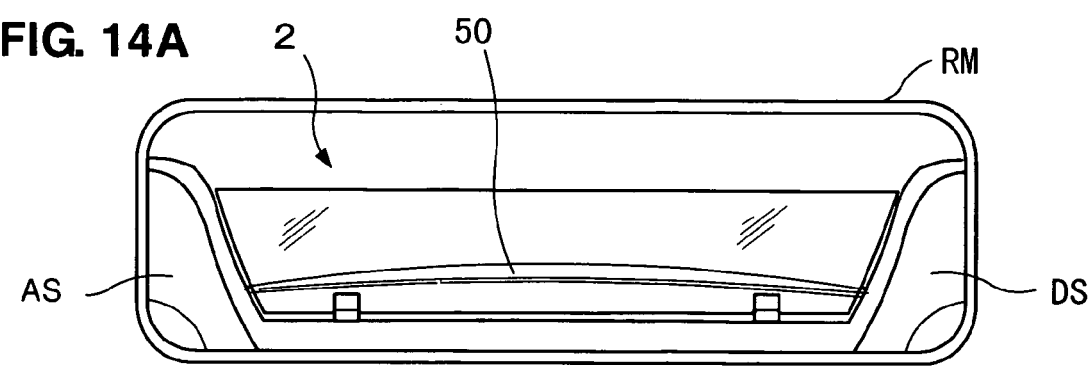
FIG. 14A is a diagram illustrating backward driver's view via a rear view mirror of the open car equipped with a wind deflector having its transparent whole area.
Figure 14B:
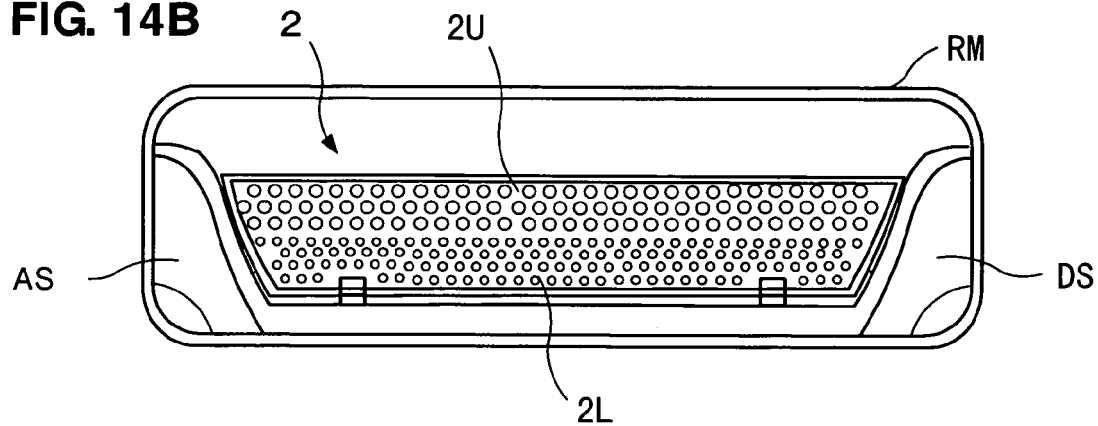
FIG. 14B is a diagram illustrating backward driver's view via the rear view mirror of the open car equipped with the wind deflector according to the present embodiment.

FIGS. 14A and 14B illustrate driver's backward view via the rear view mirror RM of the vehicle V, i.e., FIG. 14A for a case where a wind deflector having its transparent whole area is used as a comparative sample and FIG. 14B for a case where the wind deflector 2 according to the present embodiment is used. In the case where the wind deflector having its transparent whole area is used, an upper part of the folded roof panel 50 is mirrored beyond the wind deflector 2 on the rear view mirror RM, as illustrated in FIG. 14A. Meanwhile, in the case where the wind deflector 2 according to the present embodiment is used, the roof panel 50 is not mirrored as illustrated in FIG. 14B. This is because the lower section 2L of the wind deflector 2, which is located at a portion corresponding to the folded roof panel 50, comprises the small size of through holes 213 and the roof panel 50 is prevented from being mirrored on the rear view mirror RM thereby. Namely, according to the present embodiment, the driver can be provided with a properly clear rear view through the through holes 213 with the greater hole size at the upper section 2U of the wind deflector 2, whereas the roof panel 50 is not mirrored on the rear view mirror RM, being hidden by the lower section 2L with the smaller hole size, thereby providing an appropriate rear view to the driver via the rear view mirror. Herein, these function and effects can be obtained in the second and third embodiments as well as the first embodiment.

Figure 15:
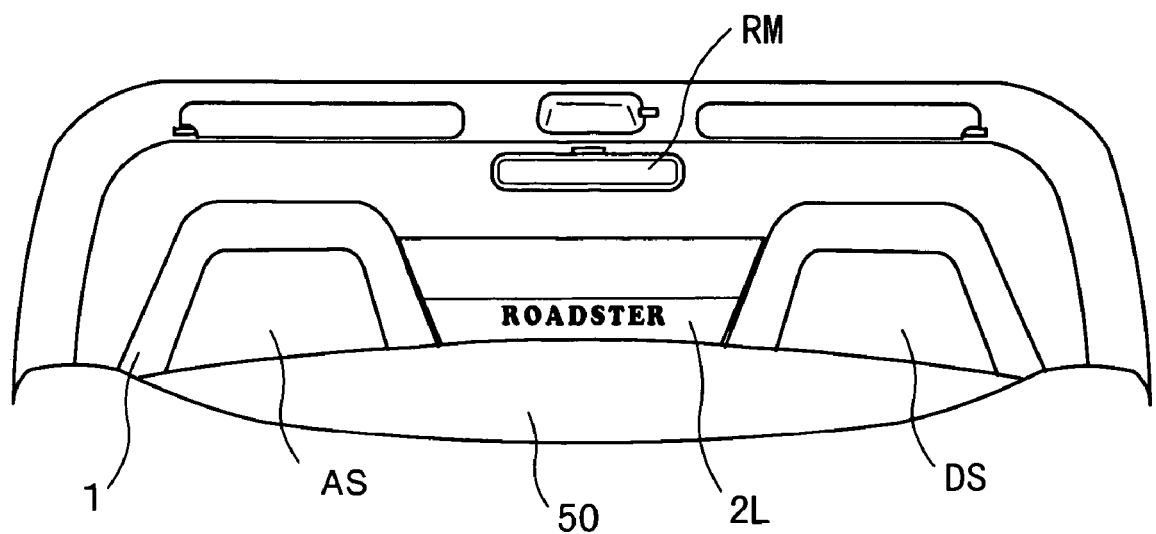
FIG. 15 is a rear view of the open car in its open sate according to the present embodiment.

Herein, a rear face of the lower section 2L of the wind deflector 2 comprises an ornamental portion. Namely, in order to improve a good appearance of the vehicle V, when viewed from the vehicle rear, any ornamental designs or logo marks may be applied to the rear face of the lower section 2L. The area of the lower section 2L of the wind deflector 2 where there are provided, for example, through holes 213 with the smaller size and/or the smaller number per the unit area is inherently a portion which may be difficult for the driver to look backward through, and thus this lower section 2L being as the ornamental portion may not cause any substantial problems for the driver's proper rear view. In other words, the area providing less problems for the driver's proper rear view can be utilized as the ornamental portion. An example with a logo mark being applied to this portion is illustrated in FIG. 15, which is a rear view of the vehicle V in its open sate embodiment. Herein, although the through holes are omitted from being illustrated in FIG. 15, such logo marks or the like can be applied by being stick on the rear face, overlapping with or avoiding the through holes 213, or by being formed integrally at the wind deflector 2 in three dimensions.

The present invention should not limited to the above-described embodiments, but any other modifications and improvements may be applied within the scope of a sprit of the present invention. For instance, any types of roll bar having a specified height behind the seats can be used in place of the above-described two-mountain-shaped one. Any types of open car with a plurality of row-seats in the longitudinal direction of the vehicle can be also applied instead of the two-seater type of open car. In this case, the roll bar and wind deflector are located behind the rearmost seats, and the cabin means an area which is substantially located behind the windshield, before the head portion of the passenger sitting on the rearmost seat and below the level of the driver's head portion. This type of vehicle can properly prevent the air flow coming from the vehicle rear from coming into the cabin during the open-sate driving as well as the above-described embodiments.

What is claimed is:

1. A wind deflector of an open car, in which an upper portion of the open car above a belt line except a windshield is detachable or foldable so as to be stored, the wind deflector being provided fixedly or detachably at a roll bar disposed behind a driver seat and an assistant seat and operative to substantially prevent an air flow from coming into a cabin from a vehicle rear behind the driver seat and the assistant seat and above the belt line, wherein said wind deflector is configured so as to allow part of the air flow coming from the vehicle rear to pass through the deflector in a forward direction, and to have air permeability in such a manner that an air permeability rate of an upper section of the wind deflector is greater than that of a lower section of the wind deflector.

2. The wind deflector of an open car of claim 1, wherein said roll bar comprises a pair of projecting portions to project upward at parts thereof corresponding to the driver seat and assistant seat, and said wind deflector is located between said projecting portions.

3. The wind deflector of an open car of claim 2, comprising a board having through holes.

4. The wind deflector of an open car of claim 3, wherein a plurality of through holes are formed at said board, and said through holes are configured in such a manner that a size of the holes formed at an upper section of the board is greater than that of the holes formed at a lower section of the board.

5. The wind deflector of an open car of claim 3, wherein a plurality of through holes having substantially the same size are formed at said board, and said through holes are configured in such a manner that the number of the holes per the unit area which are formed at an upper section of the board is greater than that of the holes which are formed at a lower section thereof of the board.

6. The wind deflector of an open car of claim 1, wherein said wind deflector is attached to the roll bar so as to fall forward and/or rearward.

7. The wind deflector of an open car of claim 3, wherein the vehicle is configured such that the upper portion thereof above the belt line including a roof is foldable except the windshield so as to be stored, and said roof is configured in a stored state thereof such that an outer face thereof is located behind the driver seat and assistant seat and turns upward and part thereof including a central portion thereof in a vehicle width direction is located above the belt line.

8. The wind deflector of an open car of claim 1, wherein a rear face of the lower section of said wind deflector comprises an ornamental portion.

* * * * *